US010544843B2

(12) United States Patent
Thomas et al.

(10) Patent No.: US 10,544,843 B2
(45) Date of Patent: Jan. 28, 2020

(54) BRAKE CALIPERS

(71) Applicant: LIBERTY VEHICLE TECHNOLOGIES LIMITED, London (GB)

(72) Inventors: Philip Thomas, London (GB); Anthony Blackwell, London (GB); Daniel Mutch-Mathieson, London (GB); Anthony Philips, London (GB); Laurie Rippin, London (GB); Benjamin Shepherd, London (GB)

(73) Assignee: Liberty Vehicle Technologies Limited, London (GB)

( * ) Notice: Subject to any disclaimer, the term of this patent is extended or adjusted under 35 U.S.C. 154(b) by 0 days.

(21) Appl. No.: 15/754,038

(22) PCT Filed: Aug. 19, 2016

(86) PCT No.: PCT/GB2016/052582
§ 371 (c)(1),
(2) Date: Feb. 21, 2018

(87) PCT Pub. No.: WO2017/032988
PCT Pub. Date: Mar. 2, 2017

(65) Prior Publication Data
US 2018/0245645 A1 Aug. 30, 2018

(30) Foreign Application Priority Data
Aug. 21, 2015 (GB) .................................. 1514925

(51) Int. Cl.
F16D 65/14 (2006.01)
F16D 55/228 (2006.01)
(Continued)

(52) U.S. Cl.
CPC ......... F16D 55/228 (2013.01); F16D 65/095 (2013.01); F16D 65/18 (2013.01);
(Continued)

(58) Field of Classification Search
CPC ................. B60T 13/741; F16D 55/228; F16D 2055/0091; F16D 2055/0066
See application file for complete search history.

(56) References Cited

U.S. PATENT DOCUMENTS 5,188,202 A * 2/1993 Terashima .............. B60T 1/065
188/73.32
10,167,911 B2 * 1/2019 Liao ...................... F16D 55/227
(Continued)

FOREIGN PATENT DOCUMENTS

CN 2690660 Y 4/2005
DE 3332548 A1 3/1985
(Continued)

OTHER PUBLICATIONS

International Search Report dated Nov. 12, 2016 (PCT/G32016/052582).
(Continued)

Primary Examiner — Nicholas J Lane
(74) Attorney, Agent, or Firm — Robert L. Stearns; Dickinson Wright, PLLC

(57) ABSTRACT

A brake caliper (100) with first and second parts (104a, 104b) between which is received a pair of braking members (102a, 102b). The caliper (100) includes a service brake mechanism having at least two piston and cylinder assemblies (108a, 110a and 108b, 110b) forming an opposed piston mechanism for forcing each of the braking members (102a, 102b) towards a brake disc to apply a service braking force thereto. The caliper (100) also includes a park brake mechanism including an actuator mechanism (112) for
(Continued)

applying a driving force to a first opposed braking member (102a) towards the brake disc and a force transmitting member (116) for transmitting the driving force to a second opposed braking member (102b). The force transmitting member (116) is supported by a sliding connection between the force transmitting member (116) and an outer surface of a first cylinder (110a) and a slidable connection between the force transmitting member (116) and a connecting member that spans the first and second parts of the brake caliper (100).

17 Claims, 4 Drawing Sheets

(51) Int. Cl.
*F16D 65/095* (2006.01)
*F16D 65/18* (2006.01)
*F16D 55/00* (2006.01)
*F16D 121/04* (2012.01)
*F16D 121/24* (2012.01)
*F16D 125/36* (2012.01)
*F16D 125/40* (2012.01)
*F16D 125/64* (2012.01)
*F16D 125/60* (2012.01)

(52) U.S. Cl.
CPC ............... *F16D 2055/0066* (2013.01); *F16D 2055/0091* (2013.01); *F16D 2121/04* (2013.01); *F16D 2121/24* (2013.01); *F16D 2125/36* (2013.01); *F16D 2125/40* (2013.01); *F16D 2125/60* (2013.01); *F16D 2125/64* (2013.01)

(56) References Cited

U.S. PATENT DOCUMENTS

| | | |
|---|---|---|
| 2010/0032250 A1 | 2/2010 | Cantoni et al. |
| 2015/0001010 A1* | 1/2015 | Liao .................. B60T 13/741 188/72.3 |
| 2015/0219171 A1 | 8/2015 | Kawamata et al. |
| 2015/0267767 A1* | 9/2015 | Liao .................. B60T 13/741 188/72.1 |
| 2017/0130788 A1* | 5/2017 | Noguchi ............... F16D 55/228 |
| 2017/0335908 A1* | 11/2017 | Liao .................. F16D 55/227 |
| 2018/0058524 A1* | 3/2018 | Suzuki ................. F16D 65/18 |

FOREIGN PATENT DOCUMENTS

| | | |
|---|---|---|
| EP | 1760352 B1 | 4/2008 |
| GB | 1156277 A | 6/1969 |
| JP | 2007056917 A | 3/2007 |
| JP | 2007239869 A | 9/2007 |
| JP | 2012246988 A | 12/2012 |
| JP | 2015124811 A | 7/2015 |
| WO | 2007039922 A1 | 4/2007 |
| WO | 2014024313 A1 | 2/2014 |
| WO | 2015098780 A1 | 7/2015 |
| WO | 2015098781 A1 | 7/2015 |
| WO | 2015152074 A1 | 10/2015 |
| WO | 2015174434 A1 | 11/2015 |

OTHER PUBLICATIONS

United Kingdom Search Report completed Feb. 8, 2016 (GB1514925.5).

Third Party Observation Proceeding, JP Patent Application No. 2018-510846, dated Jul. 1, 2019, 28 Pages.

* cited by examiner

BRAKE CALIPERS

BACKGROUND

1. Technical Field

The present invention relates to a brake caliper, a braking apparatus and a vehicle. The present invention may in particular relate to a brake caliper for applying a braking force to a brake disc of a vehicle.

2. Related Art

As is known in the art, many vehicle braking systems are required to provide two separate braking forces a service braking force and a park braking force. The service braking force is provided to slow the speed of the vehicle and bring it to a stop when required. The park braking force is required to keep the vehicle stationary when it is at rest e. g. when it is parked.

In order to provide a braking force acting towards each side of the brake disc (such that the brake pads grip the brake disc from both sides) it is known to use two basic types of caliper, moving (often referred to as sliding or floating) brake calipers or fixed brake calipers (often referred to as opposed piston). A moving caliper is arranged to move with respect to the brake disc whereby one or more piston and cylinder assemblies are located on one side of the caliper to directly apply braking force on one side of the brake disc while a similar force is applied to the other side of the brake disc via a reaction force resulting from the movement of the caliper. A fixed caliper on the other hand is known to provide improved performance over moving calipers by providing increased braking effort through use of one or more piston and cylinder assemblies (often referred to as opposed pistons) to directly apply a separate force to both sides of the brake disc.

The opposed pistons of an opposed piston caliper cannot however also be used to provide a parking brake, as a mechanism is required that maintains a braking force by direct mechanical means even when the service braking system is not active. Existing dual braking solutions involve the use of a separate caliper to provide a park brake where a fixed piston caliper is used to provide the service brake. In other known solutions, the two separate caliper types are combined into a single large caliper, with separate brake pads provided to

SUMMARY

In a first aspect, the present invention provides a pair of opposed braking members, each movable to apply a braking force to the brake disc; a service brake mechanism comprising at least two piston and cylinder assemblies, the at least two piston and cylinder assemblies forming an opposed piston mechanism arranged to force each of the braking members towards the brake disc to apply a service braking force to the brake disc; and a park brake mechanism arranged to force each of the braking members towards the brake disc to apply a park braking force to the brake disc.

Another aspect of the invention provides a brake caliper for applying a braking force to a brake disc, the caliper comprising a service brake mechanism having at least two piston and cylinder assemblies forming an opposed piston mechanism arranged to force each of a pair of opposed braking members towards the brake disc to apply, in use, a service braking force to the brake disc; and a park brake mechanism arranged to force each of the braking members towards the brake disc to apply a park braking force to the brake disc.

The caliper of the present invention allows both the service braking force and the park braking force to be applied to the brake disc via the braking members. By providing the service braking force and park braking force via the same set of braking members, the brake caliper of the present invention can be made smaller and lighter than the dual braking systems of the prior art. A body of the brake caliper of the present invention can advantageously be made to fit within a small footprint, for example, within the same or similar profile as an existing fixed service brake caliper and removes the need for a secondary caliper to apply a park braking force. The fixed brake caliper with integrated park brake of the present invention is therefore more compact, lighter, less complex to manufacture and therefore offers a technical advantage over the prior art. The caliper of the present invention may also allow simplification of the caliper mounting to the vehicle (compared to using a secondary caliper for example).

Optionally, the service braking force and the park braking force may act along a common axis. This means that both braking forces may be applied by the braking members.

Optionally, the park brake mechanism may comprise an actuator mechanism.

Optionally, at least part of the actuator mechanism and at least one of the piston and cylinder assemblies may be disposed on a common axis. This provides a compact and space saving arrangement of the actuator mechanism and pistons, and may reduce the overall size of the brake caliper.

Optionally, the at least two piston and cylinder assemblies comprises a first piston and a first cylinder, and a second piston and a second cylinder, and the actuator may be arranged to drive the first piston towards the brake disc to apply the park braking force. This allows both the park braking force the service braking force to be applied via the first braking member.

Optionally, the service brake mechanism may be arranged to drive the first piston towards the brake disc to apply the service braking force independently of the actuator mechanism. This means that although both braking forces may be applied by first and second braking members, they can still be applied independently.

Optionally, the at least two piston and cylinder assemblies may comprise two or more piston and cylinder pairs and/or two or more opposed piston mechanisms. The at least two piston and cylinder assemblies may comprise three or more piston and cylinder pairs and/or three or more opposed piston mechanisms, which may include one or more central piston and cylinder pairs and/or central opposed piston mechanisms. Preferably, one of the central piston and cylinder pairs and/or central opposed piston mechanisms comprise the first piston.

The at least two piston and cylinder assemblies may comprise a first piston and cylinder pair, for example including the first and second pistons and cylinders. The at least two piston and cylinder assemblies may comprise a second piston and cylinder pair, which may include a third piston and a third cylinder, and a fourth piston and a fourth cylinder. The at least two piston and cylinder assemblies may comprise a third piston and cylinder pair, which may include a fifth piston and a fifth cylinder, and a sixth piston and a sixth cylinder.

The at least two piston and cylinder assemblies may comprise a first, second, third and/or subsequent opposed piston mechanism. The first opposed piston mechanism may comprise the first piston and cylinder pair and/or the second opposed piston mechanism may comprise the second piston and cylinder pair and/or the third opposed piston mechanism may comprise the third piston and cylinder pair, and so on.

Optionally, the pair of braking members may comprise a first braking member and a second braking member. The actuator mechanism may be arranged to generate a driving force to force the first braking member towards the brake disc. The park brake mechanism may further comprise a force transmitting member, which may be arranged to transmit the driving force to force the second braking member towards the brake disc. This allows a park braking force to be applied on each side of the brake disc to provide a more effective braking force by gripping the brake disc from either side.

Optionally, the force transmitting member is arranged to bridge the brake disc when the brake disc is disposed between the braking members. This allows the park braking force to be applied on either side of the brake disc by an actuator located on one side of the brake disc.

Optionally, the brake caliper may further comprise a first supporting means arranged to at least partially support the force transmitting member such that it is arranged to move relative to a body of the brake caliper. The first supporting means allows an efficient arrangement to both sufficiently support the force transmitting member and allow it to move relative to the caliper body. This may reduce the number of components and reduce the weight and complexity of the brake caliper.

Optionally, at least part of the first supporting means may be movable along a common axis with the first piston and the actuator mechanism. This provides a compact arrangement to support the force transmitting member.

Another aspect of the invention provides a brake caliper for applying a braking force to a brake disc, the caliper comprising: a pair of opposed braking members, each movable to apply a braking force to the brake disc; a service brake mechanism comprising having at least two piston and cylinder assemblies, the at least two piston and cylinder assemblies forming an opposed piston mechanism arranged to force, in use, each of the a pair of braking members towards the a brake disc to apply a service braking force to the brake disc; and a park brake mechanism arranged to force each of the braking members towards the brake disc to apply a park braking force to the brake disc, the parking brake mechanism including an actuator mechanism arranged generate a driving force to force a first of the opposed braking members towards the brake disc and a force transmitting member arranged to transmit the driving force to force a second of the opposed braking members towards the brake disc; and a supporting means arranged to at least partially support the force transmitting member such that it is arranged to move relative to a body of the brake caliper, wherein the support means comprises at least one of: a first support means at least part of which is movable along a common axis with a first piston of the at least two piston and cylinder assemblies; and/or a second supporting means comprising a connecting member arranged parallel to an axis spanning between first and second parts of the brake caliper, the first part comprising a first portion of the caliper body and the second part comprising a second portion of the caliper body, the second supporting means being arranged to at least partially support the force transmitting member such that it is arranged to slide along a portion of a length of the connecting member which spans between the first and second parts.

Optionally, at least part of the first supporting means may be arranged concentrically with the first piston. This provides a compact arrangement to support the force transmitting member.

Optionally, the first supporting means may comprise a sliding contact between the force transmitting member and an outer surface of the first cylinder. This allows the first supporting means to move along the same axis as the common axis on which the first piston and actuator mechanism are arranged.

Optionally, the force transmitting member may comprise a sleeve portion, which may be tubular, that receives the outer surface of the body to provide the sliding contact. Additionally or alternatively, the force transmitting member and the body may be slidably connected together by cooperating concentric portions sharing the common axis. This provides reliable guidance and support to the force transmitting member as it translates, thereby at least partially obviating the need for outboard support mechanisms.

Another aspect of the invention provides a brake caliper for applying a braking force to a brake disc, comprising: a body, which may have first and second sides between which braking members are receivable; a service brake mechanism associated with the body and having at least two piston and cylinder assemblies, the at least two piston and cylinder assemblies forming an opposed piston mechanism arranged to force each of a pair of braking members, e.g. received, in use, by the body, towards a brake disc to apply a service braking force to the brake disc; and a park brake mechanism arranged to force each of the opposed braking members towards the brake disc to apply a park braking force to the brake disc, the parking brake mechanism including: an actuator mechanism arranged generate a driving force to force a first of the opposed braking members towards the brake disc; and a force transmitting member arranged to transmit the driving force to force a second of the opposed braking members towards the brake disc; wherein the force transmitting member and the body are slidably connected together by at least one of: cooperating concentric portions of each of the force transmitting member and the body which share a common axis with a first piston of the at least two piston and cylinder assemblies; and a slidable connection between the force transmitting member and a portion of a connecting member spanning the first and second sides of the body for supporting the force transmitting member as it moves relative to the body.

Accordingly, the first support means may be configured to support and reinforce the force transmitting member against a moment generated, in use, by virtue of the transmission of the driving force from the actuator to the second braking member. The caliper or support means may comprise a second support means, at least a portion of which may be movable along an axis that is offset, but preferably parallel to, the common axis. The second support means may comprise a sliding contact, for example between a portion of the force transmitting member and a further member, which may be fixed relative to the body.

The supporting means may comprise both the first supporting means and the second supporting means.

Optionally, the brake caliper comprises a first part comprising a first portion of the caliper body, e.g. for receiving the first braking member, and a second part comprising a second portion of the caliper body, e.g. for receiving the second braking member. The brake caliper may comprise a connecting member, which may be arranged parallel to an axis spanning between the first part and the second part. The connecting member may form or provide a second supporting means, which may be arranged to at least partially support the force transmitting member, for example such that it is arranged to slide along a portion of a length of the connecting member.

Optionally, the brake caliper may comprise a first part comprising a first portion of the caliper body and the first braking member, and a second part comprising a second portion of the caliper body and the second braking member, and a connecting member arranged parallel to an axis spanning between the first part and the second part, wherein the connecting member forms a second supporting means arranged to at least partially support the force transmitting member such that it is arranged to slide along a portion of a length of the connecting member.

Optionally, the connecting member may be arranged on an axis parallel to a common axis on which the support means and/or actuator and the first piston are disposed. This may allow the force transmitting member to slide more easily along the connecting member.

Optionally, the force transmitting member may comprise a reaction surface arranged to react against the actuation mechanism to transfer the driving force to the second braking member via the force transmitting member. This arrangement provides an efficient and compact arrangement to transfer the parking brake force to the second braking member.

Optionally, the force transmitting member may comprise an engagement member arranged to transfer the park braking force to the second braking member. This may provide a connection between the second braking member and the actuator mechanism to allow the actuator mechanism to force the second braking member towards the brake disc.

Optionally, the engagement member may not obstruct activation of the service braking force. This allows the service braking force and the park braking force to be applied independently.

Optionally, the engagement member is arranged to distribute the park braking force over at least part of a surface of the second braking member. This may provide a more even distribution of force over the brake disc and therefore provide a more effective braking force.

Optionally, the engagement member may comprise a plate or one or more finger members arranged to distribute the park braking force. This allows the force to be effectively distributed over the second braking member surface. Optionally, the finger members may be arranged to surround at least part of the second piston to allow the service braking force and the park braking force to be applied through points close together on the surface of the second braking member.

Optionally, the park brake mechanism may comprise a system arranged to apply the park braking force such that it remains in operation by direct mechanical means until such time as it is released. This means that the parking brake will remain engaged while the vehicle is not in use to ensure it remains in a secure stationary position.

Optionally, the actuator mechanism may comprise an electric motor or an expansion mechanism, for example a ball and ramp expander or a ramp system, e.g. without a ball or a screw thread arrangement. Additionally or alternatively, the actuator mechanism may comprise a coupling member, which may be coupled to or in contact with the first piston. The coupling member may comprise a first end coupled to or in contact with the first piston. The coupling member may comprise a second end coupled to or in contact with the expansion mechanism.

Optionally, the park brake mechanism may comprise a biasing member, e.g. a spring or other suitable biasing member, which may be arranged to bias the actuator mechanism toward an unengaged position. The biasing member may be arranged concentrically around the coupling member and/or may act against the caliper body.

Optionally, the park brake mechanism may comprise a system arranged to apply the park braking force such that it remains in operation by direct mechanical means until such time as it is released. This means that the parking brake will remain engaged while the vehicle is not in use to ensure it remains in a secure stationary position.

In another aspect, the present invention provides a braking apparatus comprising the brake caliper described above and a pair of opposed braking members, each of which may be movable to apply a braking force to a brake disc.

Optionally, the braking apparatus may comprise a brake disc between the opposed braking members.

In yet another aspect, the present invention provides a vehicle comprising a brake caliper or braking apparatus described above.

For the avoidance of doubt, any of the features described herein apply equally to any aspect of the invention.

THE DRAWINGS

Embodiments of the invention will now be described, by way of example only, with reference to the accompanying drawings, in which.

DETAILED DESCRIPTION

Figure 1:
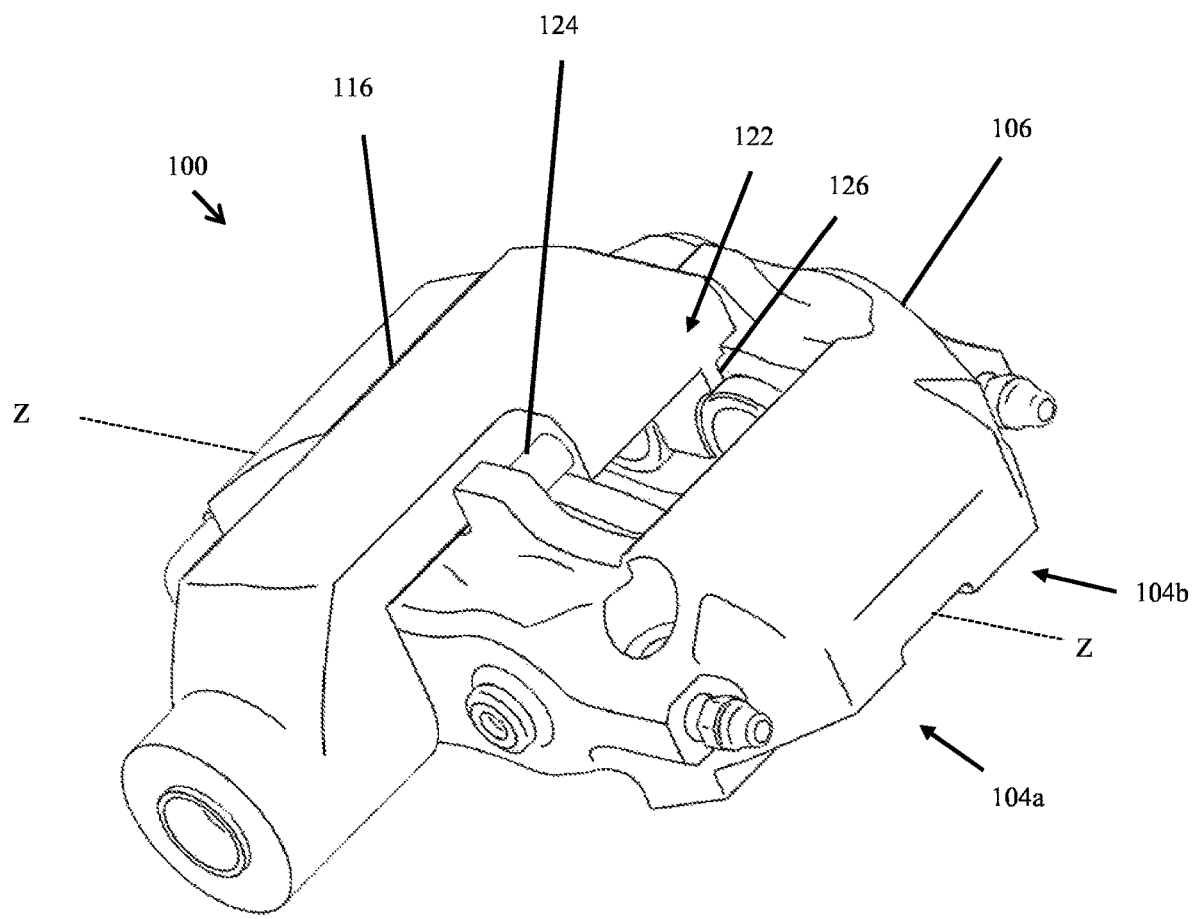
FIG. 1 shows a perspective view of a brake caliper according to an embodiment of the invention.
Figure 2:
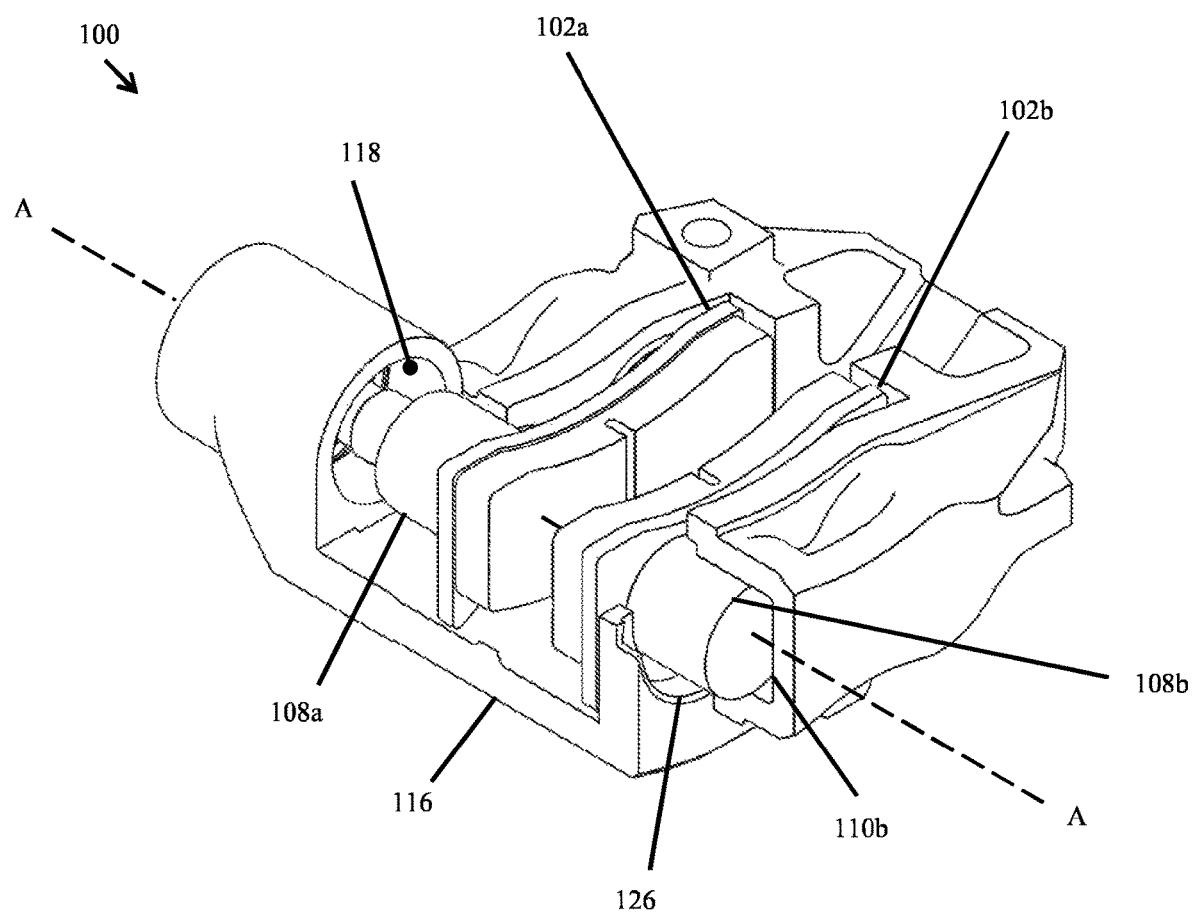
FIG. 2 shows a first cut away view of the brake caliper of FIG. 1.
Figure 3:
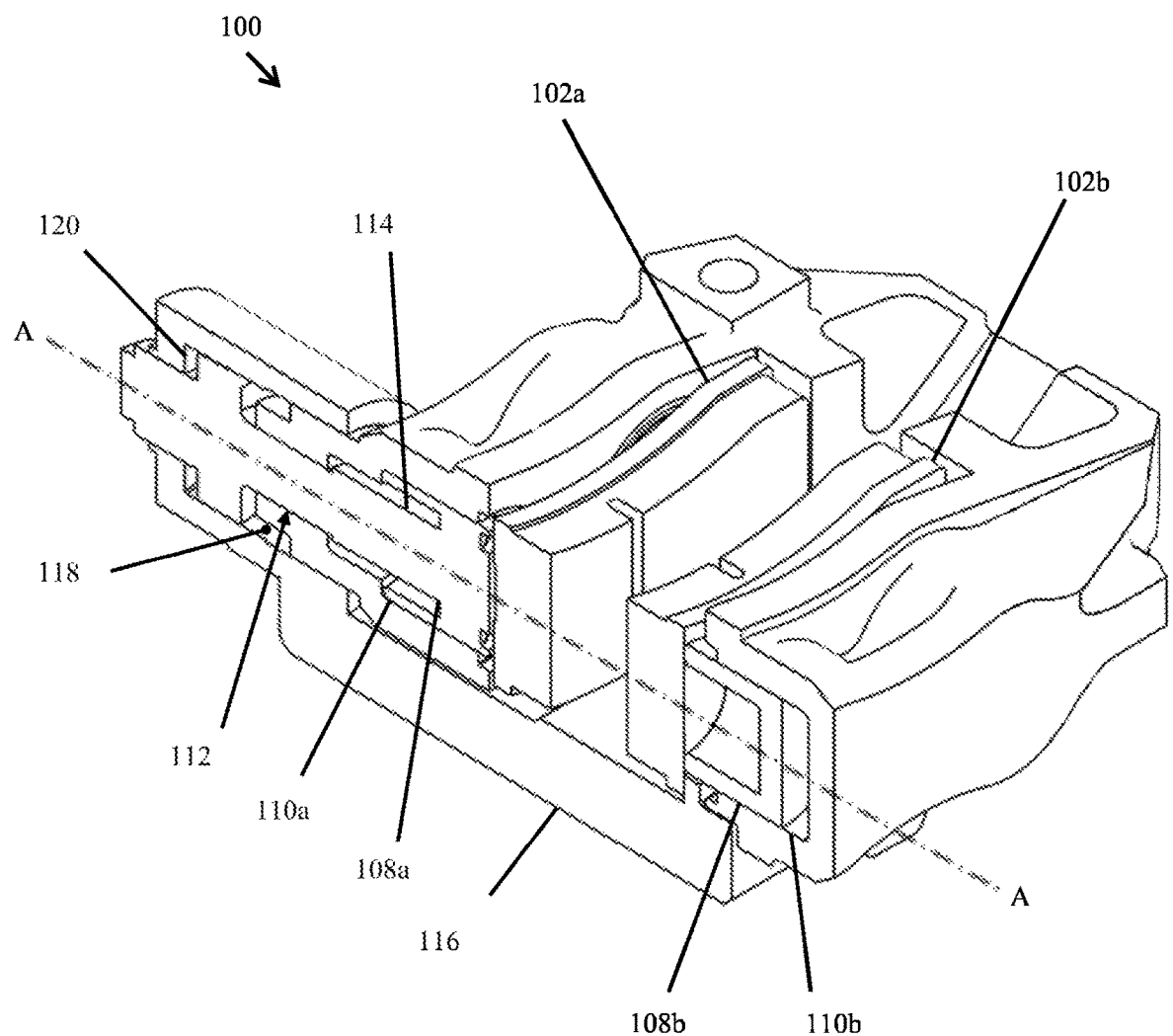
FIG. 3 shows a cross section view of the brake caliper of FIG. 1.

An embodiment of a brake caliper 100 according to the present invention is shown in FIGS. 1, 2, 3 and 4. The brake caliper 100 receives at least two opposed braking members comprising a first braking member 102*a* and a second braking member 102*b*, each movable to apply a braking force to a brake disc (not shown in the figures) disposed between the braking members 102*a*, 102*b*. The caliper shown in FIG. 1 is however only one such example, in other embodiments any other number of additional braking members may be provided as will be described later. In some embodiments, the braking members 102*a*, 102*b* comprise a brake pad arranged to generate a friction force when forced against the brake disc, thereby slowing or preventing the rotation of the brake disc. In other embodiments, the braking members may comprise a support member arranged to receive a brake pad as is known in the art. The first braking member 102*a* and the second braking member may be arranged such that their centres are on a common axis as shown in the figures (i.e. are arranged directly opposite each other). In other embodiments, the first braking member may be off-set from the second braking member 102*b* such that their centres are not on a common axis.

The brake caliper 100 comprises a first part 104*a* and second part 104*b*, each of which may be arranged on either side of a longitudinal axis (labelled Z-Z in FIG. 1) of the brake caliper 100 as shown in FIG. 1. The first part 104*a* of the brake caliper comprises a first portion of the body 106 of the brake caliper 100 and receives the first braking member 102*a*. The second part 104*b* of the brake caliper 100 comprises a second portion of the caliper body 106 and receives the second braking member 102b. The brake disc may be disposed between the first part 104a and the second part 104b such that the braking members 102a, 120b are disposed on either side of the brake disc. This allows the braking members 102a, 102b to grip the brake disc from both sides to apply a braking force. The first portion and the second portion of the caliper body may be formed from a single piece (e.g. the caliper 100 may be a mono-block caliper) or, in other embodiments, the first portion and the second portion may be formed from two, or more, interconnected separate pieces (e.g. the caliper 100 may be a two-piece caliper). The body 106 of the brake caliper may be connected to the vehicle such that it remains stationary relative to the brake disc.

The brake caliper 100 comprises a service brake mechanism arranged to force each of the braking members 102a, 102b towards the brake disc to apply a service braking force to the brake disc. The service braking force allows the brake caliper 100 to slow the rotation of the brake disc and therefore slow a vehicle to which the brake disc is attached. The service brake mechanism comprises a first piston 108a and a first cylinder 110a forming a first piston and cylinder assembly, and a second piston 108b and a second cylinder 110b forming a second piston and cylinder assembly. The first and second piston and cylinder assemblies together form an opposed piston mechanism. Each of the cylinders may be formed from a portion of the caliper body 106. Each of the cylinders may therefore be formed from a bore or cylindrical recess in the body 106 if the caliper.

In order to provide a braking force acting from each side of the brake disc, the first piston and cylinder assembly is located on one side of the brake disc (e.g. may be included in the first part 104a of the brake caliper 100), while the second piston and cylinder assembly is located on a second side of the brake disc (e.g. may be included in the second part 104b of the brake caliper 100). The two piston and cylinder assemblies are therefore arranged opposite one another such that a separate force is applied directly to each side of the brake disc (i.e. such that they form an opposed piston mechanism). This allows the caliper 100 to grip or clamp the brake disc disposed between the braking members. The brake caliper 100 is therefore of the type known generally as a fixed or opposed piston brake caliper (rather than being a moving, sliding or floating brake caliper) because a separate force is applied to each side of the brake disc while brake caliper remains stationary relative to the brake disc.

In the embodiment shown in the figures, the service brake mechanism comprises a further third piston and third cylinder forming a third piston and cylinder assembly, and a fourth piston and fourth cylinder forming a fourth piston and cylinder assembly.

In this embodiment, the first piston and the third piston are arranged to force the first braking member 102a towards the brake disc. The second piston and the fourth piston are arranged to force the second braking member 102b towards the brake disc. In other embodiments, the first and second pistons may be arranged to act via a separate pair of braking members from the third and fourth pistons.

The arrangement shown in the figures is however only one possible example arrangement of piston and cylinder assemblies according to the invention. In other embodiments, the service brake mechanism may comprise a single pair of opposed piston and cylinder assemblies (e.g. only the first 108a and second 108b pistons and first 110a and second 110b cylinders), or may in other embodiments comprise two, three, four, five, six or any other number of groups of piston and cylinder assemblies. In other embodiments, the service brake mechanism, instead of comprising pairs of piston and cylinder assemblies, may comprise groups of any number of piston and cylinder assemblies. The brake mechanism may, for example, include three piston and cylinder assemblies (e.g. the fourth piston and cylinder assembly in the described embodiment may be omitted). In such an embodiment, the first piston and third piston and respective cylinders may be of a different size to one another and the second piston and cylinder assembly so as to provide a balanced braking force to each side of the brake disc. Each of the groups of piston and cylinder assemblies may act via a single pair of braking members (e.g. the first and second braking members) or in other embodiments may act via any number of additional separate braking members. For example, a separate group of opposed braking members may be provided for each group of opposed pistons, or the braking member s may be shared between any number of groups of piston and cylinder assemblies.

In some embodiments, each of the pistons of the service braking mechanism are arranged to push a respective one of the braking members towards the brake disc. In other embodiments, each of the pistons may be arranged to push two or more separate braking members towards the brake disc. For example, each of the first or second braking members 102a and 102b of the described embodiment may be split into two or more component braking members that are all acted on by one of the pistons.

Each of the cylinders is arranged to receive a fluid, which when forced into the cylinder, causes pressure to build up, thereby forcing the respective one of the pistons to move within the cylinder towards the brake disc. In the described embodiment, the brake caliper 100 comprises a fluid channel arranged to fluidly connect each of the cylinders to supply fluid to each cylinder. In some embodiments, the fluid channel may provide an individual fluid connection to each cylinder, thereby allowing each of the pistons to be individually controlled. The fluid channel may be connected to a master cylinder arranged to convert mechanical pressure into hydraulic pressure to activate the service brake mechanism as is known in the art. Each of the cylinders may further comprise a sealing means arranged to provide a seal between each of the pistons and an internal wall of the respective cylinder to allow fluid pressure to build up within the cylinder. The sealing means may in some embodiments comprise one or more ring seals or the like.

The caliper 100 further comprises a park brake mechanism arranged to force the first and second braking members 102a, 102b towards the brake disc to apply a park braking force to the brake disc. The park braking force may be provided to maintain the brake disc at rest when the vehicle is stopped. By applying both the park braking force and the service braking force via the same braking members (i.e. the first braking member 102a and second braking member 102b) the overall size of the brake caliper 100 can be reduced in comparison to prior art dual braking systems because a separate pair of braking members is not required for each braking mechanism.

The park brake mechanism and the service brake mechanism are arranged such that the service braking force and the park braking force act along a common axis, labelled A-A in the figures. This arrangement may further provide a compact brake caliper. The common axis may be through a central, or substantially central, portion of the caliper 100.

The park brake mechanism further comprises an actuator mechanism 112 arranged to generate a driving force (which may act via a reaction surface and a force transmitting member as will be described later) to push each of the first and second braking members 102a, 102b towards the brake disc. At least part of the actuator mechanism 112 and at least one of the piston and cylinder assemblies of the service brake mechanism may be disposed along a common axis (or at least approximately along a common axis). This common axis may be the same common axis along which the service braking force and the park braking force act (i.e. axis A-A in the figures). In the described embodiment, both the first piston 108a and the second piston 108b are each disposed on axis A-A along with the actuator mechanism 112. In the described embodiment, where the first piston 108a and actuator mechanism 112 are generally cylindrical in shape, the first piston 108a and actuator mechanism 112 may be arranged concentrically along axis A-A. In other embodiments, only one of the first and second pistons 108a, 108b may be disposed along a common axis with the actuator mechanism 112. For example, the second piston 108b may be offset from axis A-A such that only the first piston 108a and the actuator mechanism 112 lie along axis A-A. This may, for example, also be the case in embodiments where the service braking mechanism comprises three piston and cylinder assemblies. In such an embodiment, the first piston 108a may be on a common axis with the actuator mechanism 112, with a second and third piston offset from the common axis to provide a balanced service braking force. By providing a brake caliper 100 in which the actuator mechanism and at least one of the piston and cylinder assemblies of the service brake mechanism are on a common axis, the brake caliper 100 may be made more compact and therefore fit within a smaller profile (i.e. it has a smaller footprint).

The service brake mechanism is arranged to drive the first piston 108a towards the brake disc to apply the service braking force independently of the actuator mechanism 112. This means that the first piston 108a can be driven alternatively by the actuator mechanism 112, or by fluid forced into the first cylinder. This allows the park braking force and the service braking force to be applied independently of one another. In some embodiments, where a third and fourth piston and cylinder assembly are provided, a second actuator mechanism may be arranged to drive the third piston towards the brake disc to provide a greater park braking force. In yet other embodiments, a single actuator mechanism may be arranged to drive more than the piston (e.g. the first piston and the third piston) towards the brake disc.

In order to apply the park braking force, the actuator mechanism 112 may be movable between an engaged position in which each of the braking members 102a, 102b are forced towards the brake disc and a disengaged position in which each of the braking members 102a, 102b are not forced towards the brake disc. The actuator mechanism 112 may comprise a system arranged to apply the park braking force such that it remains in operation by direct mechanical means until such time as it is released (i.e. the park brake mechanism is "mechanical"). This is necessary to keep the vehicle in a secure stationary position while not in use, or while no fluid pressure is present in the cylinders. The actuator mechanism 112 may therefore comprise a mechanical system that cannot release itself e. g. it requires an external input such as the user releasing the vehicle handbrake or the vehicle control module providing an input to an electric motor used to control the actuator mechanism (e.g. to 'unwind' or 'release' the park brake mechanism). The actuator mechanism 112 may therefore be movable between the engaged position and disengaged position only under the action of an external input. In some embodiments, the park braking mechanism may have a locked condition in which the actuator mechanism is prevented from moving from an engaged position to a disengaged position.

In the described embodiment, the actuator mechanism 112 comprises an expansion mechanism arranged to generate the driving force. The expansion mechanism may, for example, comprise a ball and ramp expander as is known in the art. The ball and ramp expander is however only one such example of an expansion mechanism that may be implemented to provide a driving force. In other embodiments, the expansion mechanism may comprise a ramp system without a ball or a screw thread arrangement. In yet other embodiments the actuator mechanism may take a different form other than an expansion mechanism. In some embodiments, the expansion mechanism may be replaced by, for example, a linear actuator or a screw thread or a cam or lever arrangement.

Figure 4:
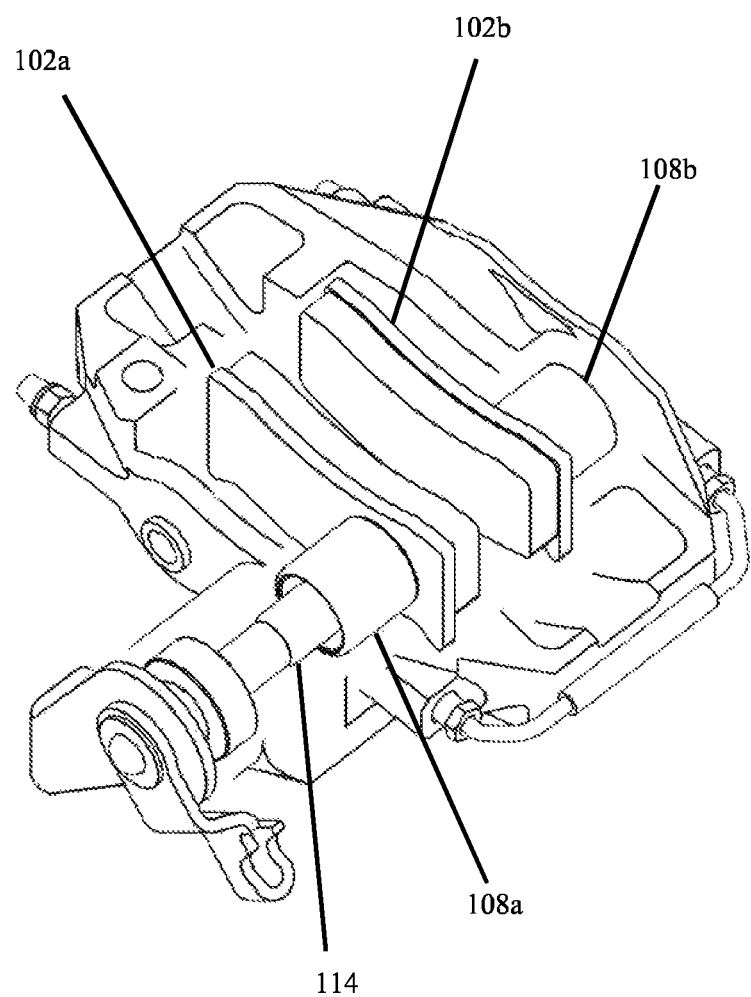
FIG. 4 shows a second cut away view of the brake caliper of FIG. 1.

In the described embodiment, the actuator mechanism 112 is arranged to convert a rotational input movement into a translational output movement. In this embodiment, the translational output movement is only generated in response to a rotational input movement. This ensures that the actuator mechanism remains in the engaged position until such a time that a further rotational input movement is provided. In the described embodiment, the actuator mechanism comprises a lever mechanism (as illustrated in FIG. 4) which is actuated by a cable to provide the rotational input. The cable may be attached to the vehicle brake lever such that a force applied to the cable may rotate the actuator mechanism 112 such that it is moved between the engaged position and the disengaged position. In other embodiments, the actuation mechanism 112 may be electrically controlled with the rotational input movement provided by an electric motor.

In order to drive the first piston 108a towards the brake disc to provide the park braking force, the actuator mechanism 112 comprises a coupling member 114 comprising a first end coupled to (or in contact with) the first piston 108a and a second end coupled to the expansion mechanism. The first piston 108a is therefore either forced towards the brake disc by the pressure of fluid within the first cylinder 110a, or alternatively by the action of the actuator mechanism 112. This allows both the park braking force and the service braking force to be applied independently via the first piston 108a acting on the first braking member 102a. Separate braking members are therefore not needed to apply each braking force which may result in a reduction in the number of components required, and therefore the size and weight of the brake caliper 100, may be reduced. In the described embodiment, the coupling member 114 is arranged to extend through the first cylinder 110a and may in some embodiments extend along or parallel to axis A-A. The coupling member may, in some embodiments, comprise an elongate member such as a rod or bolt arranged to extend through the first cylinder. This arrangement may allow both the actuator mechanism 112 and the first piston 108a to be compactly arranged along a common axis. The first piston 108a and the actuator mechanism 112 are thus arranged in a space saving manner that may reduce the overall size of the brake caliper 100.

The park brake mechanism may in some embodiments further comprise a biasing member (not shown in the figures) arranged to bias the actuator mechanism 112 towards the unengaged position. The biasing member may in some embodiments comprise a spring arranged to bias the actuator mechanism 112 toward the unengaged position. In some embodiments, the biasing member may be arranged concentrically around the coupling member 114 and may act against the caliper body 106. This arrangement reduces the overall size of the brake caliper 100. In other embodiments, the biasing member may not be present. This may, for example, be the case in embodiments where an electric motor is provided to move the actuator mechanism between the engaged and disengages position, but may also apply to embodiments where a lever and cable actuation are provided.

The park brake mechanism further comprises a force transmitting member 116 arranged to transmit the driving force to the second braking member 102b in order to force the second braking member 102b towards the brake disc. This allows both of the first and second braking members 102a, 102b to be forced towards the brake disc by the actuator mechanism 112 such that the brake disc is gripped from both sides. In the described embodiment, the force transmitting member 116 is arranged to bridge the brake disc when the brake disc is disposed between the braking members 102a, 102b. The force transmitting member 116 may, in some embodiments, span an opening in the caliper body 106 between the first part and the second part. The force transmitting member is therefore arranged to transmit the driving force generated by the actuator mechanism from the first part 104a of the brake caliper 100 to the second part of the brake caliper 104b (e.g. from one side of the brake disc to the other). As the actuator mechanism 112 forces the first piston 108a against the surface of the brake disc, a reaction force will be generated which acts in an opposite direction to the movement of the first braking member 102a towards the brake disc. The force transmitting member 116 may further comprise a reaction surface 120 arranged to react against the actuation mechanism 112 to transfer the driving force to the second braking member 102b via the force transmitting member 116. The force transmitting member 116 is arranged to transmit this reaction force to the second braking member 102b, such that it acts to force the second braking member 102b towards the brake disc. This may allow the park braking force to act towards both sides of the brake disc without the requirement of a separate actuator mechanism on each side of the brake disc. This may reduce the footprint and overall size of the caliper 100 such that it may fit within a smaller profile and may also reduce the weight of the brake caliper 100.

The brake caliper 100 further comprises a first supporting means or structure 118 arranged to at least partially support the force transmitting member 116 such that it is arranged to move relative to the body 106 of the brake caliper 100. At least part of the first supporting means 118 is arranged to move along the common axis on which the actuator mechanism 112 and at least one of the first and second pistons 108a, 108b are disposed (i.e. axis A-A). In such an embodiment, at least part of the first supporting means 118 may be concentric with the first piston 108a. This may provide a space saving arrangement such that the brake caliper 100 can be made small and compact. In the described embodiment, the first supporting means 118 comprises a sliding contact between the force transmitting member 116 and an outside surface of the first cylinder 110a. As illustrated in this embodiment, the force transmitting member 116 may include, for example, a sleeve that surrounds the outer surface of the first cylinder 110a and/or provides the sliding contact. Thus, the force transmitting member 116 and the body 106 may be slidably connected together by cooperating concentric portions that share the common axis A-A. It should be noted that the invention is not limited to the sleeve configuration shown in the drawings, it may comprise any tubular or part-tubular configuration and/or any suitable cross-sectional shape or any other suitable configuration.

In some embodiments, the sliding contact may be between part, or all, of the outer surface of the first cylinder. In other embodiments, the first supporting means 118 may additionally or alternatively comprise a sliding contact between an outer surface of the actuator mechanism 112 and the force transmitting member 116. The outer surface of the first cylinder may comprise a portion of the caliper body 106 forming the first cylinder, and may be generally cylindrical in shape. The outer surface is however not limited to this shape, and may, for example, have any other profile such an oval or rectangular shape. This allows the first supporting means 118 to slide along axis A-A and provides a particularly space saving and compact arrangement. In some embodiments, the force transmitting member 116 may be supported entirely by the first supporting means 118, whereas in other embodiments, an additional supporting means may also be provided.

The brake caliper may further comprise a second supporting means or structure 122 arranged to at least partially support the force transmitting member 116 in addition to the first supporting means 118. The second supporting means 122 may comprise a connecting member 124 at least part of which is arranged parallel (or approximately parallel) to an axis spanning between the first part 104a and the second part 104b of the brake caliper 100. In the described embodiment, the connecting member 124 may comprise an elongate member spanning between the first part 104a and the second part 104b of the caliper 100. In the described embodiment, the elongate member comprises a rod or bolt having a generally cylindrical shape, but may, in other embodiments, comprise an elongate member having any other suitable shape or profile such that it may support the force transmitting member 116. The connecting member 124 may be arranged to at least partially support the force transmitting member 116. In some embodiments, the connecting member 124 may be disposed parallel or close to parallel to the common axis A-A. This allows the force transmitting member 116 to slide more easily along the connecting member 124. In some embodiments, the connecting member 124 may be located close to or adjacent to the common axis A-A. This may further allow the force transmitting member 116 to slide more easily. In some embodiments, the connecting member 124 may be arranged to connect the first portion and second portion of the caliper body 106 (e.g. may be a "caliper bridge" as is known in the art). By using the connecting member to provide both structural support for the caliper body and as a support for the force transmitting member, the overall number of components required is reduced, which therefore provides an efficient and compact arrangement.

In other embodiments, the connecting member may be arranged to connect the first braking member 102a and the second braking member 102b rather than providing a connection directly between the caliper body 106. The connecting member 124 may in some embodiments be joined or rigidly connected to each portion of the caliper body or each of the braking members 102a, 102b. In other embodiments however, the connecting member 124 may be a separate component which is supported by (rather than rigidly connected to) the caliper body 106 or braking members 102a, 102b. In some embodiments, the second support means 122 may be located anywhere on the caliper body 106 and may in some embodiments comprise a portion of the caliper body 106 rather than a separate component. The second support means may for example comprise a protruding feature (e.g.

a lip or ridge extending from the surface of the caliper body), or groove or channel in a surface of the caliper body.

The force transmitting member 116 may be arranged to slide along at least part of the length of the connecting member 124. The force transmitting member 116 may comprise a guide means arranged to guide the movement of the force transmitting member along the connecting member 124. In the described embodiment, the guide means comprises an aperture in a body of the force transmitting member 116 arranged to receive the connecting member 124. In other embodiments, the guide means may comprise a channel or recess in a surface of the force transmitting member 116.

The force transmitting member 116 further comprises an engagement member 126 arranged to transfer the park braking force to the second braking member 102b. The engagement member 126 is arranged such that it does not obstruct activation of the service braking force and allows independent application of either the park braking force or the service braking force via the second braking member 102b. The engagement member may therefore be arranged to engage with the second braking member 102b such that the second braking member 102a may be either actuated by the force transmitting member 116 or the second piston 108b, depending on whether the park braking force or the service braking force should be applied, respectively. The engagement member 126 is therefore arranged to engage with the second braking member to apply the park braking force independently of the service braking force.

In the described embodiment, the engagement member 126 is arranged to distribute the park braking force over at least part of a surface of the second braking member 102b. The engagement member 126 may comprise a plate, which in some embodiments is arranged to extend at least part way along a length of the second braking member 102b. This spreads the reaction force across the surface of the second braking member 102b, thus distributing the park braking force over the surface of the brake disc. In other embodiments, the engagement member may comprise one or more finger members arranged to distribute the park braking force over the surface of the second braking member 102b. In some embodiments, the finger members may be arranged to extend around at least part of the second piston 108b. This allows the second braking member 102b to be forced towards the brake disc by either the engagement member 126 or the second piston 108b and provides a compact arrangement to reduce the overall size of the brake caliper 100.

In use, a brake disc may be disposed between the braking members 102a, 102b to form a braking apparatus. The braking apparatus may in turn be fitted to a vehicle. In use, the brake caliper 100 allows a park braking force or a service braking force to be selectively applied via the first and second braking members 102a, 102b. If the service brake is applied (by for example the user pressing the brake pedal of the vehicle) fluid is forced into each of the cylinders 110a, 110b, via the fluid channel. This results in each of the pistons 108a, 108b, forcing each of the braking members 102a, 102b towards the brake disc. Alternatively, if the park brake is applied, the actuation mechanism 112 is activated such that the expansion mechanism expands. This generates a driving force that is coupled to the first piston 108a via the coupling member 114. The driving force forces the first piston 108a (and in turn the first braking member 102a) towards the brake disc. The driving force acting against the brake disc results in a reaction force in the opposite direction. This is transmitted via the reaction surface 120, the force transmitting member 116 and the engagement member 126 to the second braking member 102b so that the park braking force is applied to each side of the brake disc. The brake caliper 100 therefore allows the application of a park braking force and service braking force to the brake disc via the braking members 102a, 102b.

Various modifications will be apparent to the skilled person without departing from the scope of the claims. For example, the present invention is not limited to only a single pair of braking members arranged to act against each side of a brake disc disposed between them. In other embodiments, any additional number of braking members may also be provided, such that at least a first one of the braking members acts towards a first side of the brake disc and at least a second of the braking members acts to oppose the first braking member by acting towards a second side of the brake disc. At least the first braking member and the second braking member are both forced against the brake disc by the service brake mechanism and the park brake mechanism. Any, or all, of the additional braking members may also be forced against the brake disc by both the service brake mechanism and the park brake mechanism. In some embodiments, any, or all, of the additional braking members may be forced against the brake disc by only the service brake mechanism or by only the park brake mechanism. In some embodiments, there may be an even number of braking members such that they may be arranged in pairs of opposed braking members. In other embodiments, there may be an odd number of braking members such that they are arranged in groups of any number of opposed braking members, rather than pairs of braking members. For example, the pair of opposed braking members shown in the figures could be replaced by three braking members (i.e. a third braking member may be provided which may be forced against the same side of the brake disc as the first or the second braking member).

The present invention is similarly not limited to a service brake mechanism having a single pair of opposed piston and cylinder assemblies. In other embodiments, any number of piston and cylinder assemblies may be provided, such that at least a first piston and cylinder assembly is arranged to force the first braking member towards a first side of the brake disc and a second piston and cylinder assembly is arranged to force the second braking member towards a second side of the brake disc. In other embodiments, any number of additional piston and cylinder assemblies may be provided. Any, or all, of the additional piston and cylinder assemblies may also force either one of the first and second braking members towards a respective side of the brake disc. In other embodiments, any, or all, of the additional piston and cylinder assemblies may act via additional braking members rather than acting via the first and second braking members. The service brake mechanism may comprise an even number of piston and cylinder assemblies arranged in opposed pairs, or in other embodiments may comprise an odd number of piston and cylinder assemblies arranged groups of any suitable number of piston and cylinder assemblies, rather than being arranged in pairs.

What is claimed is:

1. A brake caliper for applying a braking force to a brake disc, the caliper comprising: a service brake mechanism having at least two piston and cylinder assemblies forming an opposed piston mechanism arranged to force, in use, each of a pair of braking members towards a brake disc to apply a service braking force to the brake disc;

a park brake mechanism arranged to force each of the braking members towards the brake disc to apply a park braking force to the brake disc, the parking brake mechanism including an actuator mechanism arranged to generate a driving force to force a first of the opposed braking members towards the brake disc and a force transmitting member arranged to transmit the driving force to force a second of the opposed braking members towards the brake disc; and a supporting structure arranged to at least partially support the force transmitting member such that it is arranged to move relative to a body of the brake caliper, wherein the supporting structure comprises a sliding contact between the force transmitting member and an outer surface of a first cylinder of the at least two piston and cylinder assemblies, which is movable along a common axis with a first piston of the at least two piston and cylinder assemblies.

2. The brake caliper according to claim 1, wherein at least part of the supporting structure is arranged concentrically with the first piston.

3. The brake caliper according to claim 1, wherein the sliding contact between the force transmitting member and an outer surface of the first cylinder comprising a first supporting structure and the brake caliper includes a second supporting structure comprising a connecting member arranged parallel to an axis spanning between first and second parts of the brake caliper, the first part comprising a first portion of the caliper body and the second part comprising a second portion of the caliper body, the second supporting structure being arranged to at least partially support the force transmitting member such that it is arranged to slide along a portion of a length of the connecting member which spans between the first and second parts.

4. The brake caliper according to claim 3, wherein the force transmitting member comprises a sleeve portion that receives the outer surface of the body to provide the sliding contact.

5. The brake caliper according to claim 1, wherein the force transmitting member and the body are slidably connected together by cooperating concentric portions sharing the common axis.

6. The brake caliper according to claim 1, wherein the connecting member is arranged on an axis parallel to a common axis on which the actuator and the first piston are disposed.

7. The brake caliper according to claim 1, wherein the force transmitting member comprises a reaction surface arranged to react against the actuation mechanism to transfer the driving force to the second braking member via the force transmitting member.

8. The brake caliper according to claim 1, wherein the force transmitting member comprises an engagement member arranged to transfer the park braking force to the second braking member.

9. The brake caliper according to claim 8, wherein the engagement member does not obstruct activation of the service braking force.

10. The brake caliper according to claim 8, wherein the engagement member is arranged to distribute the park braking force over at least part of a surface of the second braking member.

11. The brake caliper according to claim 10, wherein the engagement member comprises plate or one or more finger members arranged to distribute the park braking force.

12. The brake caliper according to claim 1, wherein the supporting structure comprises the first supporting structure and at least part of the actuator mechanism is disposed on the common axis.

13. The brake caliper according to claim 12, wherein the at least two piston and cylinder assemblies comprises the first piston and a first cylinder, and a second piston and a second cylinder, and the actuator is arranged to drive the first piston towards the brake disc to apply the park braking force.

14. The brake caliper according to claim 13, wherein the service brake mechanism is arranged to drive the first piston towards the brake disc to apply the service braking force independently of the actuator mechanism.

15. The brake caliper according to claim 1, wherein the force transmitting member is arranged to bridge the brake disc when the brake disc is disposed, in use, between the braking members.

16. The brake caliper according to claim 1, wherein the at least two piston and cylinder assemblies comprises three or more opposed piston mechanisms with at least one central opposed piswn mechanism which includes the first piston.

17. A braking apparatus according to claim 1 comprising a brake disc opposed between the braking members.

* * * * *